(12) United States Patent
Hendrickson et al.

(10) Patent No.: US 8,786,785 B2
(45) Date of Patent: Jul. 22, 2014

(54) VIDEO SIGNATURE

(75) Inventors: Seth Hendrickson, Bellevue, WA (US); George Randell Dong, Issaquah, WA (US); Saswata Mandal, Bellevue, WA (US); Charles Lawrence Zitnick, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 13/080,494

(22) Filed: Apr. 5, 2011

(65) Prior Publication Data

US 2012/0257116 A1 Oct. 11, 2012

(51) Int. Cl.
*H04N 5/14* (2006.01)

(52) U.S. Cl.
USPC ........................................ 348/700

(58) Field of Classification Search
USPC ........................................ 348/700
See application file for complete search history.

(56) References Cited

U.S. PATENT DOCUMENTS

| | | | | |
|---|---|---|---|---|
| 4,353,088 | A | * | 10/1982 | den Toonder et al. ........ 380/206 |
| 4,739,398 | A | * | 4/1988 | Thomas et al. ............... 725/22 |
| 5,767,923 | A | * | 6/1998 | Coleman, Jr. ................. 348/700 |
| 5,870,754 | A | * | 2/1999 | Dimitrova et al. .................. 1/1 |
| 2004/0240562 | A1 | | 12/2004 | Bargeron et al. |
| 2006/0013451 | A1 | | 1/2006 | Haitsma |
| 2008/0239159 | A1 | | 10/2008 | Read et al. |
| 2009/0022472 | A1 | | 1/2009 | Bronstein et al. |
| 2010/0049711 | A1 | | 2/2010 | Singh et al. |
| 2010/0238350 | A1 | | 9/2010 | Radhakrishnan et al. |
| 2010/0302450 | A1 | | 12/2010 | Farkash |
| 2010/0306791 | A1 | | 12/2010 | Deng |
| 2011/0032984 | A1 | | 2/2011 | Dorman et al. |

FOREIGN PATENT DOCUMENTS

WO WO 2010084713 A1 * 7/2010

OTHER PUBLICATIONS

Joly, et al., "Content-Based Video Copy Detection in Large Databases: A Local Fingerprints Statistical Similarity Search Approach", Retrieved at <<http://ieeexplore.ieee.org/stamp/stamp.jsp?tp=&arnumber=1529798&userType=inst Date Nov 10, 2005 >>, International Conference on Image Processing, Nov. 10, 2005, pp. 4.

Yang, et al., "A Color Fingerprint of Video Shot for Content Identification", Retrieved at <<http://www1.i2r.a-star.edu.sg/~tian/ConferencePapers/ACM-MM04/acm-mm04-p276-yang.pdf >>, Proceedings of the 12th annual ACM international conference on Multimedia, Oct. 10-16, 2004, p. 276-279.

Ren, et al., "Shot Boundary Detection in MPEG Videos using Local and Global Indicators", Retrieved at <<http://ieeexplore.ieee.org/stamp/stamp.jsp?arnumber=04914820 >>, IEEE Transactions on Circuits and Systems for Video Technology, vol. 19, No. 8, Aug. 2009, p. 1234-1238.

(Continued)

*Primary Examiner* — Sath V Perungavoor
*Assistant Examiner* — Jeffery Williams
(74) *Attorney, Agent, or Firm* — Bryan Webster; Andrew Sanders; Micky Minhas

(57) ABSTRACT

Video signatures are generated when a small change in video information between consecutive frames N−1 and N is followed by a large change in video information between consecutive frames N and N+1. Information from frames N and/or N+1 is used to form a video signature.

20 Claims, 5 Drawing Sheets

(56) References Cited

OTHER PUBLICATIONS

Amel, et al., "Video Shot Boundary Detection using Motion Activity Descriptor", Retrieved at <<http://arxiv.org/ftp/arxiv/papers/1004/1004.4605.pdf >>, Journal of Telecommunications, vol. 2, No. 1, Apr. 2010, p. 54-59.

"International Search Report", Mailed Date: Oct. 18, 2012, Application No. PCT/US2012/030396, Filed Date: Mar. 23, 2012, pp. 8.

* cited by examiner

VIDEO SIGNATURE

BACKGROUND

Identification information, such as metadata, is often not included with digital video content. Often this results in a viewer being unable to identify the title, year of production, genre of content, or any other information he or she may desire for a satisfactory viewing experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for finding a video signature is provided. The method comprises dividing each of frame N, frame N+1, and frame N−1 of the video into a plurality of cells and calculating a video attribute for each cell of each frame. A difference metric is calculated between frames N and N+1 and frames N and N−1 based on the video attributes of each frame, and the difference metrics are compared to a threshold. If the difference metric of frames N and N+1 exceeds a first threshold and a difference metric between frames N and N−1 does not exceed a second threshold, information from frame N and frame N+1 is used as a video signature.

DETAILED DESCRIPTION

The playback of media content, such as digital video, that lacks external identifying information may present problems, as the title of the video, the date it was produced, and other information may be needed by a viewer for a satisfactory viewing experience. To locate identifying information for an unknown video, video signatures may be generated by identifying shot changes within the video. Shot changes may be defined by a large change in the image information between two consecutive frames N and N+1 of the video, along with a small change in the image information between frame N and the preceding frame N−1. Information from the shot change can then be used to generate a video signature. The video signature may be easily reproducible on different versions of the same video.

Such a video signature may be compared to a video signature database that includes video signatures for a library of reference videos, as well as identifying information (e.g., metadata) for each such reference video. If a match is found, the external identifying information from the matching reference video can be applied to the unknown video. In some embodiments, a Euclidean distance between the tested signature and the reference signature may be used to determine whether a match exists. In some embodiments, such a Euclidean distance must be zero, and in other embodiments a small difference may be allowed.

Figure 1:
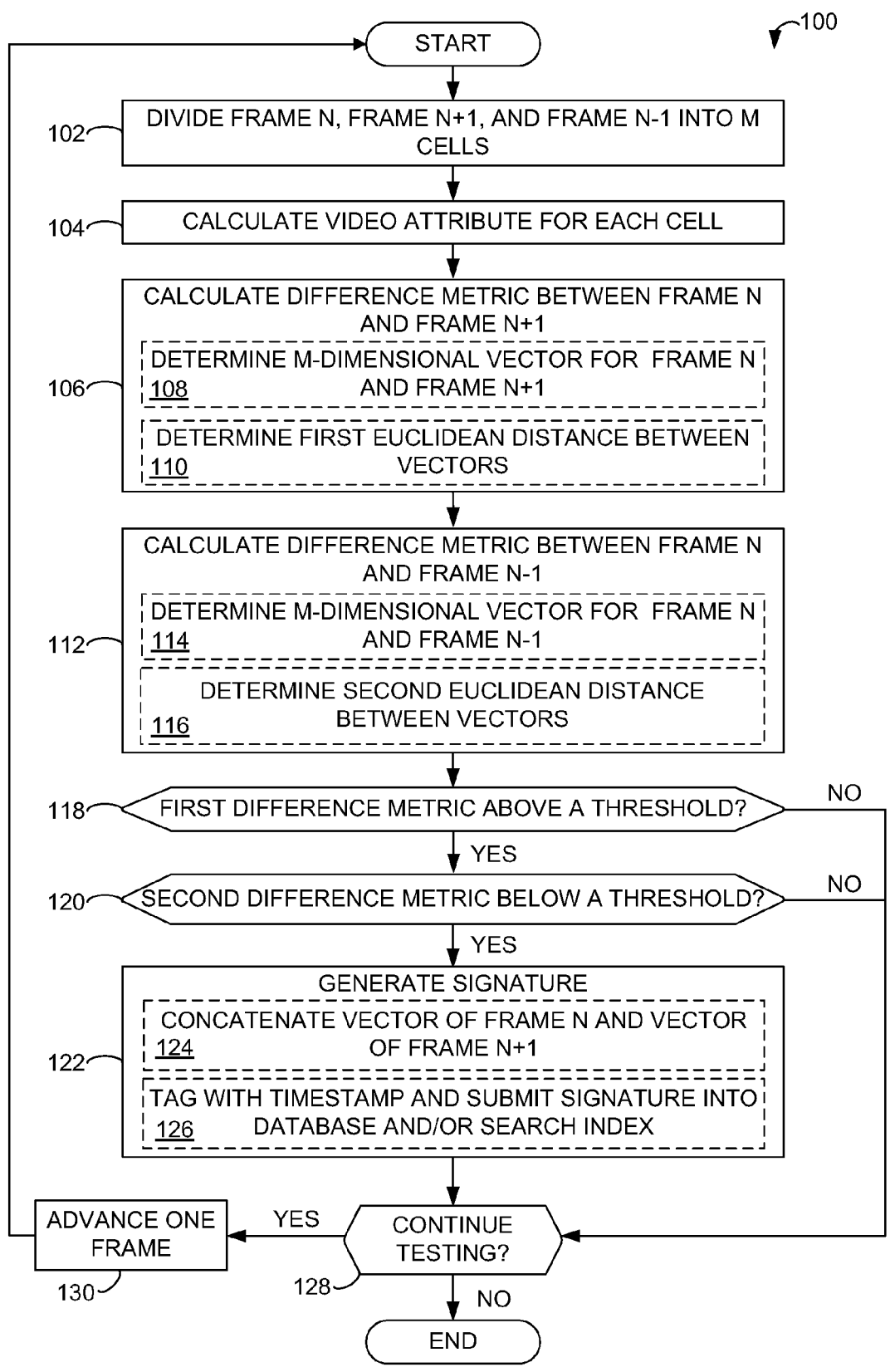
FIG. 1 is a flow diagram depicting a method for finding a signature of a video stream according to one embodiment of the present disclosure.

FIG. 1 shows a flow diagram depicting a method 100 for finding a video signature according to one embodiment of this disclosure. Method 100 may be executed by a computing device capable of video playback and/or video streaming. Example computing devices include but are not limited to desktop computers, laptop computers, mobile computing devices, and TV set-top boxes. The computing device may further be connected to other computing devices over a network for receiving video streams and/or accessing a video signature database, which will be described in more detail below. Further detail about the computing device will be described with reference to FIG. 5.

At 102, method 100 includes dividing frames within the video into a plurality of cells. Each frame of a series of frame N, frame N+1, and frame N−1 are divided into M cells. In one example, M cells may include 16 equal sized cells arranged in a four by four (4×4) grid. In another example, M cells may include 25 equal sized cells arranged in a five-by-five grid. Any number of cells in any arrangement is within the scope of this disclosure.

A video attribute for each cell is calculated at 104. In some embodiments, the video attribute is an average luminance for that cell, calculated by averaging the luminance values for each pixel within the cell. In some embodiments, the video attribute may be an average luminance for that cell normalized with respect to an average luminance for all cells of that frame. Other suitable attributes could be used, such as rank order of the luminance of each cell, an average color value, etc.

At 106, a first difference metric is calculated between frame N and frame N+1. As an example, the difference metric may be a Euclidean distance between a vector calculated for frame N and a vector calculated for frame N+1. To calculate this difference metric, an M-dimensional vector for each of frame N and frame N+1 is determined at 108. The M-dimensional vector for each frame includes, for each different dimension, a video attribute of a different cell from that frame.

Figure 2:
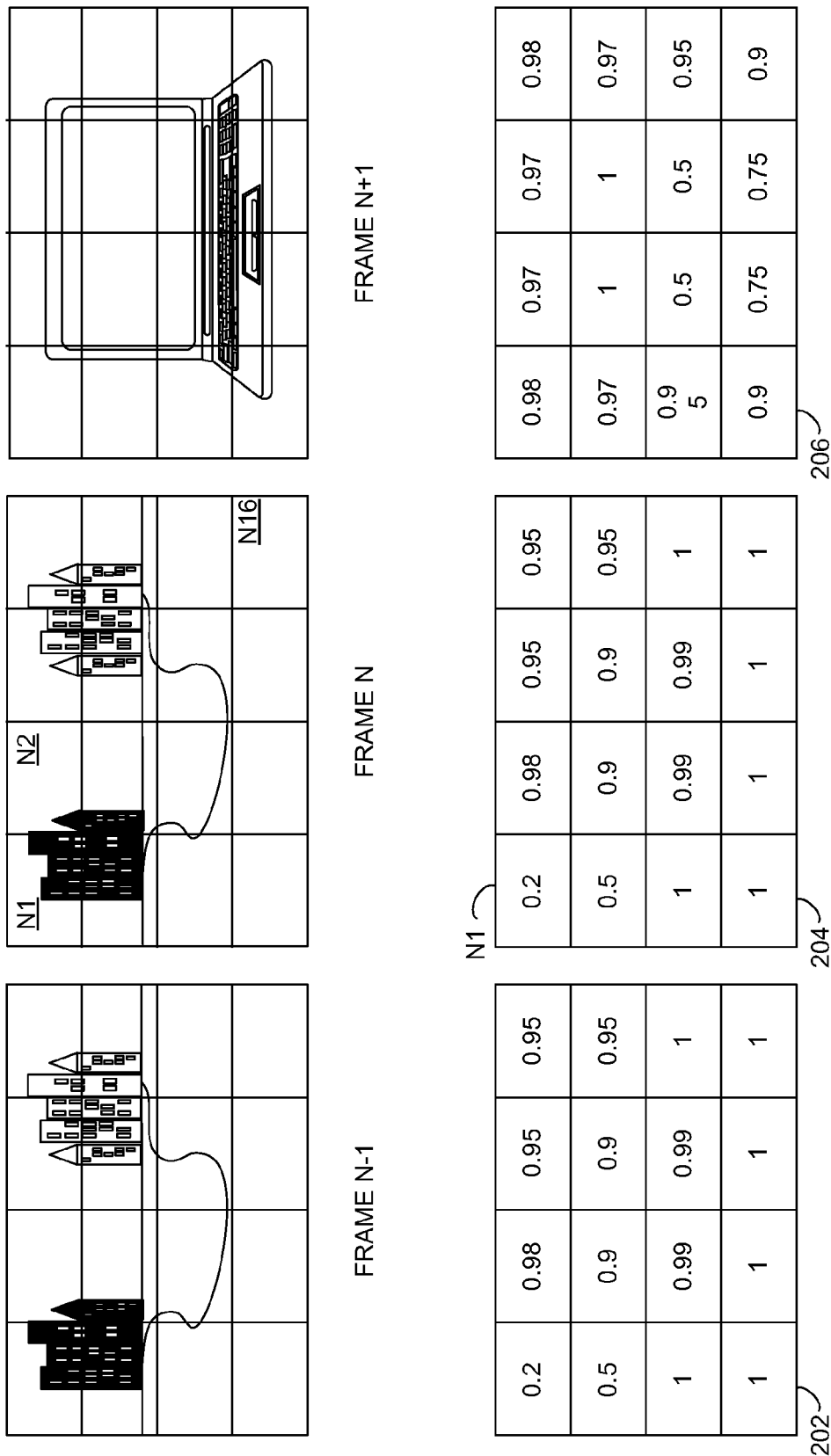
FIG. 2 schematically shows frames from a video and associated luminance values according to one embodiment disclosed herein.

For example, FIG. 2 shows a frame N of a video divided into a 4×4 grid including 16 cells (i.e., cell N1, N2, . . . N16). Furthermore, table 204 of FIG. 2 shows a luminance value for each cell of frame N. For each cell, the average luminance is calculated from the luminance value for each pixel of that cell. In this example, luminance is represented by a scale from 0 to 1, where 0 is no luminance (i.e. the cell is all black and no light is emitted) and 1 is the maximum luminance (i.e. the cell is all white and the maximum amount of light the pixels can emit is being emitted). For example, cell N1 has a luminance value of 0.2. The M-dimensional vector may include a 16-dimensional vector based on the luminance for each of the 16 cells of the divided frame. For example, frame N would have a 16-dimensional vector comprising:

$$\vec{v}_N = (0.2, 0.98, 0.95, 0.95, 0.5, 0.9, 0.9, 0.95, 1, 0.99, 0.99, 1, 1, 1, 1, 1)$$

while frame N+1, based on the table of luminance values 206, would have a 16-dimensional vector comprising:

$$\vec{v}_{N+1} = (0.98, 0.97, 0.98, 0.07, 1, 1, 0.97, 0.95, 0.5, 0.5, 0.95, 0.9, 0.75, 0.75, 0.9).$$

Turning back to FIG. 1, at 110, method 100 includes calculating a Euclidean distance between the vectors. For example, in FIG. 2, the Euclidean distance between frame N and frame N+1 of FIG. 2 may be calculated using the following equation:

$$d(p,q) = \sqrt{(p_1-q_1)^2 + (p_2-q_2)^2 \ldots (p_n-q_n)^2}$$

where p is the vector for frame N, q is the vector for frame N+1, and n=16 as the vectors comprise 16 dimensions. Therefore, the Euclidean distance between frame N and frame N+1 of FIG. 2 would be approximately 1.21.

Referring back to FIG. 1, a second difference metric is calculated between frame N and frame N−1 at 112. Similar to the difference metric calculated at 106, an M-dimensional vector is determined for each frame N and frame N−1 at 114, and these vectors are used to determine a second Euclidean distance at 116.

At 118, the first difference metric calculated between frames N and N+1 is compared to a first threshold. If the first difference metric is above the first threshold, the method proceeds to 120. If it is not above the threshold, the method advances to 128. The second difference metric is compared to a second threshold at 120. If the second difference metric is below the second threshold, the method proceeds to 122, and if it is not below the threshold, the method advances to 128. The first and second thresholds for comparing the first and second difference metrics may be similar. Alternatively, the two thresholds may be different. The thresholds may be determined empirically or by any suitable mechanism.

Referring to the example frames depicted in FIG. 2, for frame N−1, a 16-dimensional vector based on the luminance values in table 202 would be the same as the vector for frame N, as the frames depict the same image. Therefore, the Euclidean distance, calculated using the same equation as described above, would result in a distance of 0 between frames N and N−1.

In order to determine if the frames constitute a shot change, the calculated Euclidean distances can each be compared to a threshold. In this example, the first and second thresholds are equal, and empirically determined to be equal to one. Thus, the distance from frame N to frame N+1, $\Delta_{N \rightarrow N+1}=1.21$, which is greater than the first threshold of 1. The distance from frame N to frame N−1, $\Delta_{N \rightarrow N-1}=0$, which is less than the second threshold, which is also 1 in this case. As the first distance is greater than the threshold and the second is not, a shot change is identified.

At 122 in FIG. 1, information from one or both of frame N and frame N+1 is included as a video signature. The vector of frame N may be concatenated with the vector of frame N+1 at 124 to generate the signature, in this embodiment a 32-dimensional vector based on the luminance values for frame N and frame N+1. At 126, the signature is associated with a timestamp indicating the time relative to the start of the video at which the shot change occurs. The signature may then be submitted to a database of predetermined signatures, and/or the signature may be entered into a search index to search for a matching reference signature. For example, if the video is a known video that contains identifying information, the signature may be submitted to a reference video signature database along with the identifying information for use at a later time, such as when searching the database for a match to an unknown video. Alternatively, if the video is an unknown video that does not contain identifying information, the signature generated may be entered into a search index to search for a matching signature contained within a known reference video from the reference video signature database.

Method 100 may proceed to iteratively test subsequent frames if it is determined at 128 that the testing should continue to identify other signatures within the video. Virtually any criteria may be used to determine if additional testing should continue. For example, such testing may continue unless the end of the video has been reached or a user indicates that testing should be terminated. If the testing is to continue, the method advances one frame at 130, and loops back to the beginning of method 100. Additionally, if either of the first or second difference metrics does not meet its respective condition relative to the thresholds at 118 and 120, one frame may be advanced and the method may iteratively test subsequent frames. It should be understood that some steps for subsequent testing may not need to be repeated from previous testing. For example, if one of the tested frames has already been divided and an M-dimensional matrix has been found for that frame, such dividing and calculating need not be repeated.

Alternatively, if it is determined the testing should not continue (e.g. if all signatures in the video have been identified) the method ends.

It should be understood that the method 100 need not be carried out in the order described. For example, the difference metric between frame N and frame N−1 may be calculated before, after, or concurrently to the calculation of the difference metric between frame N and frame N+1. Similarly, comparing the first difference metric to the threshold may occur before, after, or concurrently to the comparison of the second difference metric to the threshold.

By using average luminance values of a grid of even sized cells, shot changes may be identified even when manipulations have been made to the video. For example, it is common in videos distributed over the internet for the contrast, brightness, etc. to be altered from the original video source. By utilizing an average luminance for each cell normalized to the average luminance for the entire frame, differences in relative brightness may be accounted for. Furthermore, the identification of shot changes is not dependent on the timing of the video, so that videos that have been sped up or slowed down may also be identified. Finally, clips of videos may also be identified, so long as the clip contains at least one shot change.

The process of identifying shot changes and creating signatures can be performed on video content that contains identifying information as well as video content that does not contain identifying information. Video signatures from a known video can be associated with that video in a reference database. One example method for searching such a database includes locality sensitive hashing. In this method, each reference signature is given a code, termed a hash code, and each hash code is distributed into buckets of a hash table. The unknown video signature, or client signature, is also given a hash code. The bucket the client signature is distributed to reasonably contains only those reference signatures similar to the client signature. From these, a difference metric, such as a Euclidean distance, may be calculated between the client signature and the references signatures.

Figure 3:
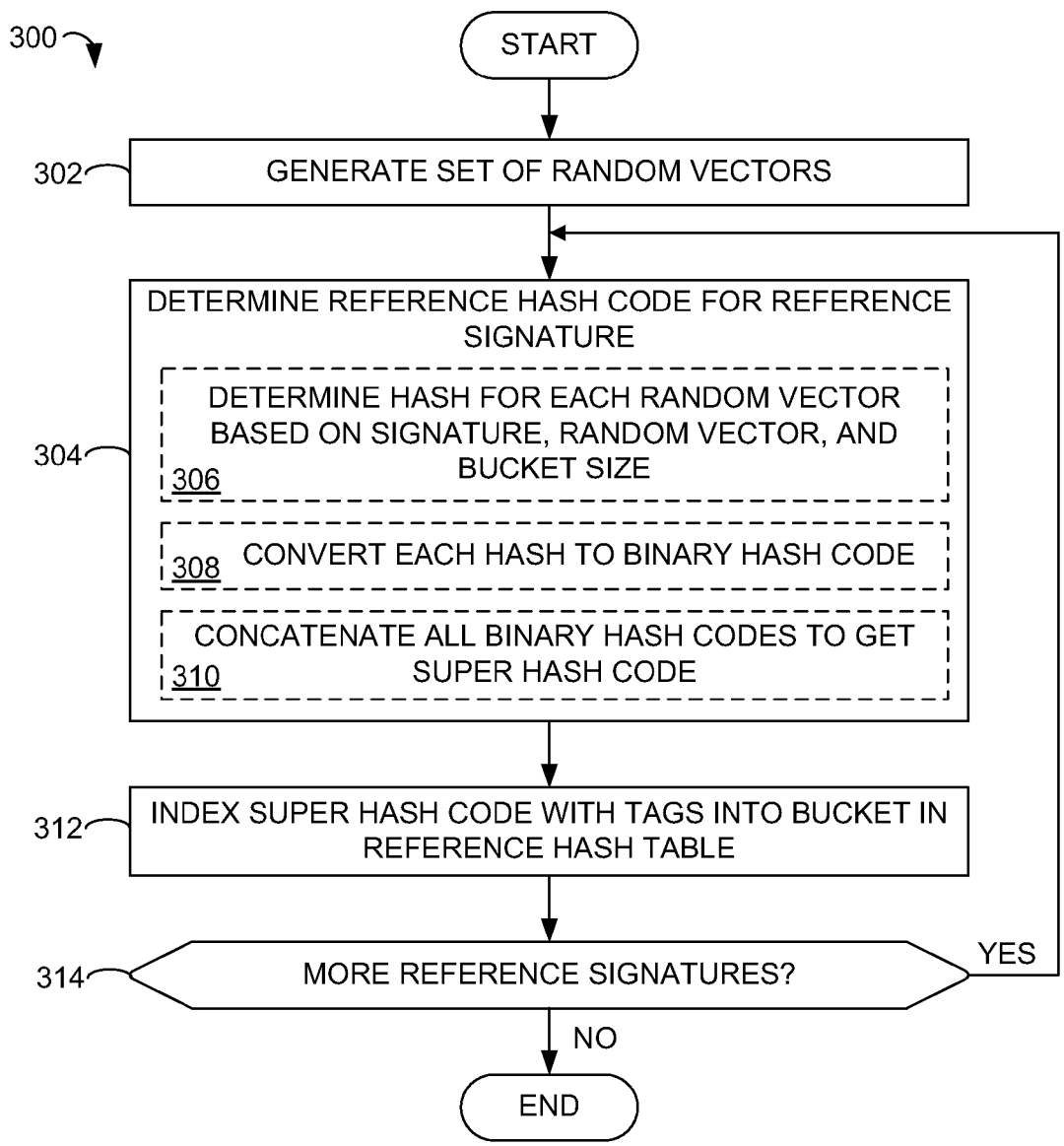
FIG. 3 is a flow diagram depicting an example embodiment for entering reference signatures into a search index database.

An example method 300 of generating hash codes for reference video signatures is described with reference to FIG. 3. At 302, method 300 includes generating a set of n random vectors ($v_1, v_2 \ldots v_n$), the components of which should be independent and identically distributed normal random variables. The n random vectors may be generated once, and the set may be used for determining a hash code at 304 for every signature generated. The following nonlimiting example will be described with reference to a 32-dimensional vector corresponding to frames divided into 4×4 grids.

A hash $H_i$ is determined at 306 for each random vector. Each $H_i$ may be calculated using the following equation:

$$H_i = \frac{[S \cdot v_i]}{B}$$

where S is the 32-dimensional reference signature, $v_i$ is the 32-dimensional random vector, and B is the bucket size, which may be determined experimentally. A large B may produce more reliable search results, however it increases the size of the hash bucket and thus the length of time required to perform a search within that bucket due to the increased number of signatures within that bucket. At 308, the hash may then be converted to binary to get a hash code. $H_i$ is determined for i=1, 2 . . . n, and then all are converted to binary and concatenated to get a super hash code H at 310. Method 300 includes, at 312, indexing each super hash code into a bucket of a reference hash table along with tags, such as a timestamp from the video where the signature occurs, title of video, etc. If more reference signatures are to be hashed at 314, the process repeats itself.

Figure 4:
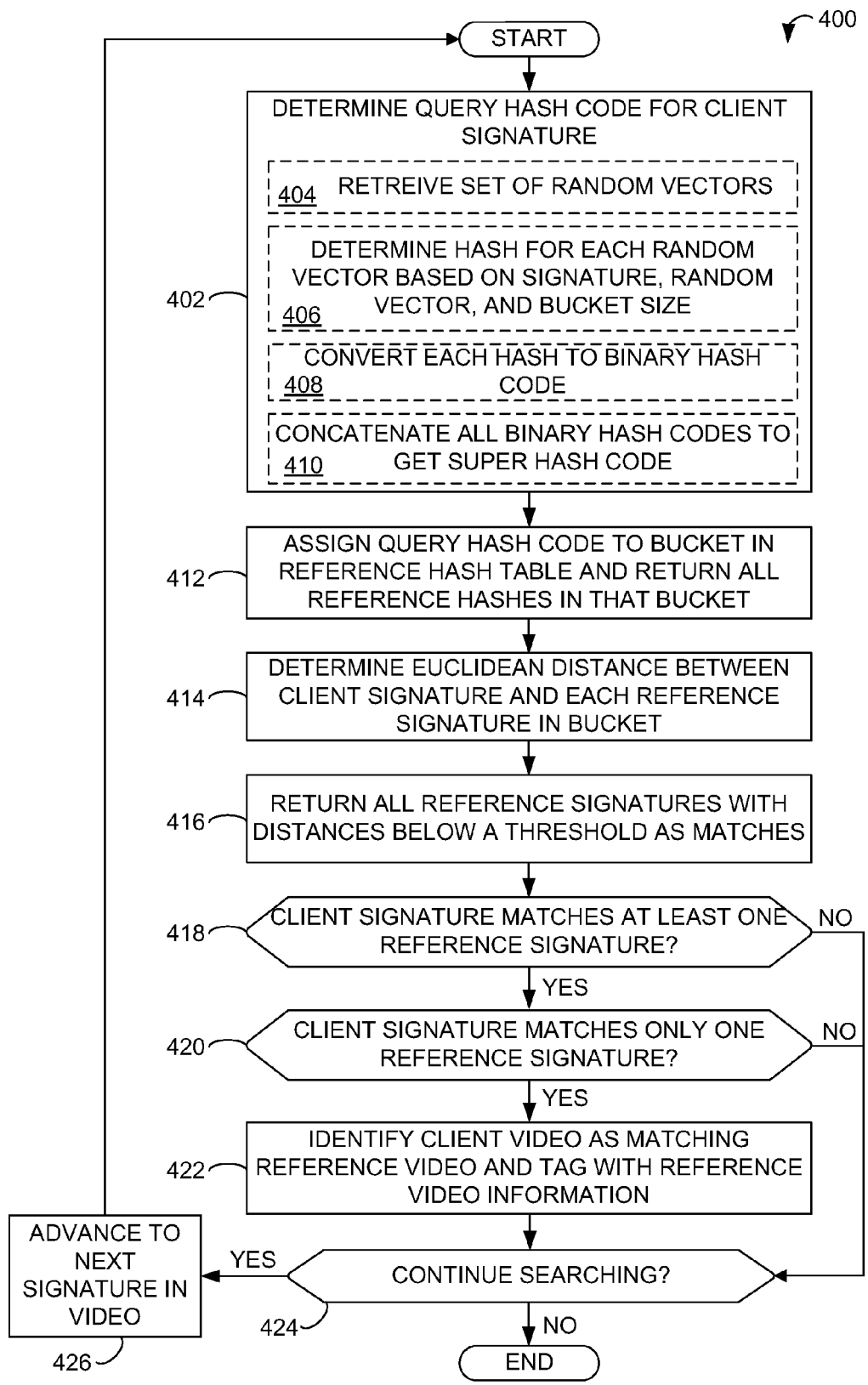
FIG. 4 is a flow diagram depicting an example embodiment for entering a client signature into a search index.

FIG. 4 depicts a flow diagram showing an embodiment of a method 400 for entering an unknown, or client, signature into a search index to find a matching reference signature. The method 400 includes determining a query hash code for the client signature at 402. Similar to the method described in reference to FIG. 3, a hash is determined at 406 based on the client signature, random vector (retrieved at 404 from the set generated at 302), and bucket size, for each random vector of the set. Each hash code is converted to binary at 408, and all binary hash codes are concatenated at 410 to produce a query super hash code for the client signature, H'. The query super hash code H' is assigned to a bucket of the reference hash table, and all reference hashes stored in that bucket are returned at 412. A difference metric, such as a Euclidean distance, can be calculated at 414 between the client signature and each reference signature in the bucket. At 416, all reference signatures that have Euclidean distances below a threshold may be returned as a match. If no matches exist at 418, the method may proceed to 424. If more than one match exists at 420, the signature may be deemed to derive from common content, such as a commercial, or be a low quality signature, and thus the method may advance to 424. If it is determined at 418 and 420 that only one match exists, there is a high probability the client signature and reference signature are from the same video. In this case, the client video may be identified as the reference video at 422, and the information accompanying the reference video, such as title, date, etc., may be added to the client video. At 424, method 400 includes determining if it is necessary to continue searching signatures within the video for more matches. For example, it may be necessary to keep searching for matches to additional client signatures within the video if no matches could initially be found, or if multiple matches were found. If it is determined that searching should be continued, the method 400 advances a next signature in the video at 426 and loops back to the beginning of method 400.

Additionally, accuracy of the matching beyond the difference metric between the client signature and the reference signature may be increased. This can be accomplished by verifying that more than one client signature in the video matches a reference signature from that video. Further, if multiple matching signatures are found between the known and unknown video, the accuracy can be further verified by correlating the difference between the timestamps from two signatures in the reference video vs. the difference between the timestamps of the same two signatures of the client video. As explained above with regard to FIG. 1, timestamps may be associated with the video signatures. As the client video content may be altered compared to the reference video, using an absolute time correlation may not be an accurate method of verification, as the client video may be shortened, or include extra video information. However, if the difference between two timestamps is used, an accurate correlation may be made. For example, a first video signature of a reference video may be associated with timestamp 1:35 and a second signature of that video may be associated with 1:50. In this example a difference between the two is 0:15. If the client video has a signature that matches the first reference signature with a timestamp of 2:15 and a second signature that matches the second reference signature with a timestamp of 2:30, there is a high likelihood that the matches are accurate, as there are two matching signatures, and the differences between the timestamps of the signatures are the same.

In some embodiments, the above described methods and processes may be tied to a computing system including one or more computers. In particular, the methods and processes described herein may be implemented as a computer application, computer service, computer API, computer library, and/or other computer program product.

Figure 5:
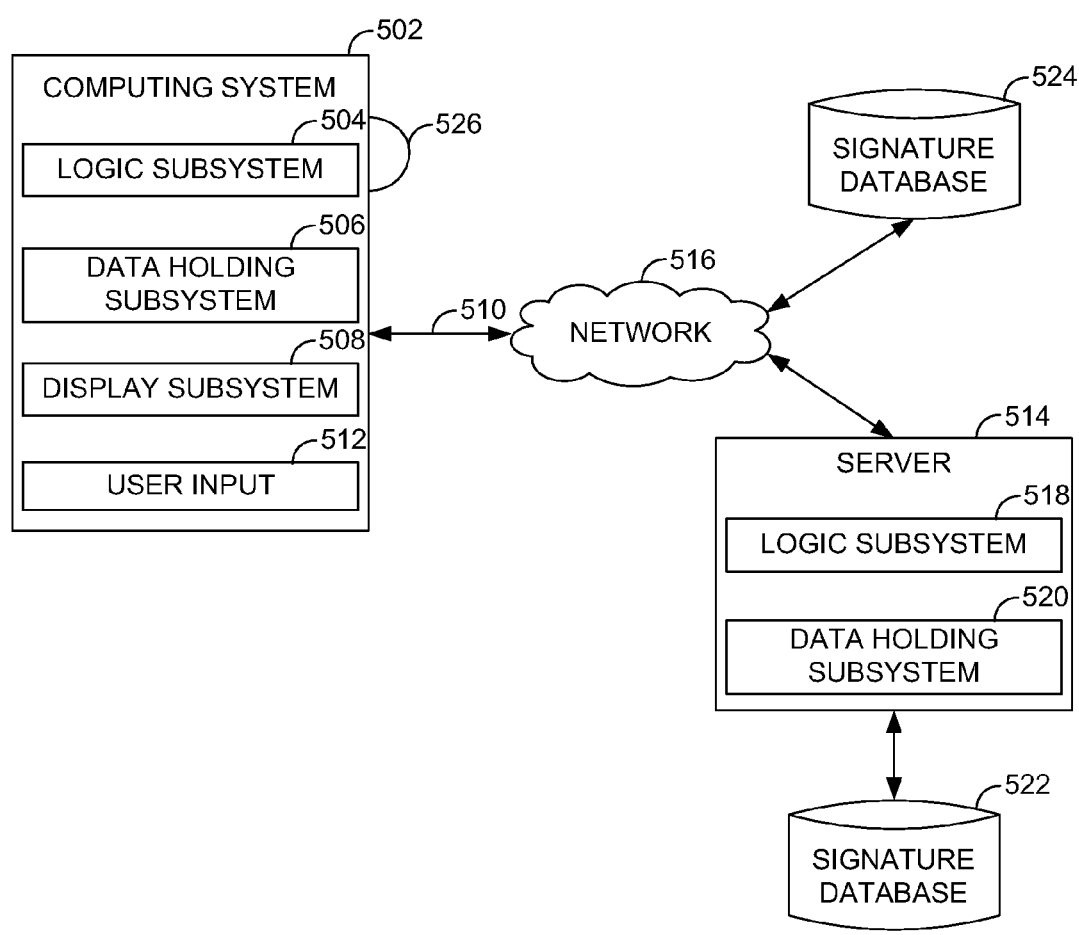
FIG. 5 schematically shows a non-limiting computing device for executing the embodiments disclosed herein.

FIG. 5 schematically shows a nonlimiting computing system 502 that may perform one or more of the above described methods and processes. Computing system 502 is shown in simplified form. It is to be understood that virtually any computer architecture may be used without departing from the scope of this disclosure. In different embodiments, computing system 502 may take the form of a mainframe computer, server computer, desktop computer, laptop computer, tablet computer, home entertainment computer, network computing device, mobile computing device, mobile communication device, gaming device, etc.

Computing system 502 includes a logic subsystem 504 and a data-holding subsystem 506. Computing system 502 may optionally include a display subsystem 508, communication subsystem 510, and/or other components not shown in FIG. 5. Computing system 502 may also optionally include user input devices 512 such as keyboards, mice, game controllers, cameras, microphones, and/or touch screens, for example.

Computing system 502 may be configured to communicate with a remote computing device such as a server 514 over a network 516. Similar to computing system 502, server 514 includes a logic subsystem 518 and a data-holding subsystem 520. Server 514 may send video streams to computing system 502 for viewing by a user. The video streams, if they lack identifying information, may be searched for video signatures, as described with reference to FIGS. 1 and 2. Furthermore, server 514, or another server, may search reference videos for video signatures and also may utilize a reference signature database 522 for storing tagged reference signatures. Alternatively, a reference signature database 524 may be stored remotely from the server, and the server may access the database over the network.

Because of the distributed nature of a hash table, the duties of server 514 may be split up into a distributed network of servers. In this case, there would be a load balancer which communicates with computing system 502, and delegates signature matching to one of several servers depending on the hash value for the incoming signature match request. Each server would host a subset of the database corresponding to certain hash buckets from the hash table. There could optionally be overlap in which hash buckets each server holds, but each hash bucket will be held by some server, so that the entire hash table is represented throughout the distributed system.

Logic subsystem 504 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 506 may include one or more physical, non-transitory, devices configured to hold data and/or instructions executable by the logic subsystem to implement the herein described methods and processes. When such methods and processes are implemented, the state of data-holding subsystem 506 may be transformed (e.g., to hold different data).

Data-holding subsystem 506 may include removable media and/or built-in devices. Data-holding subsystem 506 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 506 may include devices with one or more of the following characteristics: volatile, nonvolatile, dynamic, static, read/write, read-only, random access, sequential access, location addressable, file addressable, and content addressable. In some embodiments, logic subsystem 504 and data-holding subsystem 506 may be integrated into one or more common devices, such as an application specific integrated circuit or a system on a chip.

FIG. 5 also shows an aspect of the data-holding subsystem in the form of removable computer-readable storage media 526, which may be used to store and/or transfer data and/or instructions executable to implement the herein described methods and processes. Removable computer-readable storage media 526 may take the form of CDs, DVDs, HD-DVDs, Blu-Ray Discs, EEPROMs, and/or floppy disks, among others.

It is to be appreciated that data-holding subsystem 506 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 502 that is implemented to perform one or more particular functions. In some cases, such a module, program, or engine may be instantiated via logic subsystem 504 executing instructions held by data-holding subsystem 506. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 508 may be used to present a visual representation of data held by data-holding subsystem 506. As the herein described methods and processes change the data held by the data-holding subsystem, and thus transform the state of the data-holding subsystem, the state of display subsystem 508 may likewise be transformed to visually represent changes in the underlying data. Display subsystem 508 may include one or more display devices utilizing virtually any type of technology. Such display devices may be combined with logic subsystem 504 and/or data-holding subsystem 506 in a shared enclosure, or such display devices may be peripheral display devices.

When included, communication subsystem 510 may be configured to communicatively couple computing system 502 with one or more other computing devices, such as server 514. Communication subsystem 510 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 502 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of finding a signature for a video, the method comprising:
   dividing a frame N of the video into a plurality of cells;
   calculating a video attribute of each cell of frame N;
   dividing a frame N+1 into the plurality of cells;
   calculating a video attribute of each cell of frame N+1;
   dividing a frame N−1 of the video into a plurality of cells;
   calculating a video attribute of each cell of frame N−1;
   calculating a difference metric between frame N and frame N+1 that includes, for each cell of the plurality of cells, a difference between the video attribute of frame N and the video attribute of frame N+1;

calculating a difference metric between frame N and frame N−1 that includes, for each cell of the plurality of cells, a difference between the video attribute of frame N and the video attribute of frame N−1; and generating a video signature that includes information from one or both of frame N and frame N+1 responsive to the difference metric between frame N and frame N+1 exceeding a first threshold and a difference metric between frame N and frame N−1 not exceeding a second threshold.

2. The method of claim 1, wherein the plurality of cells includes M cells, and where an M-dimensional vector for each frame includes the video attribute for each of the plurality of M cells.

3. The method of claim 2, wherein calculating the difference metric between frame N and frame N+1 includes calculating a Euclidean distance between the M-dimensional vector for frame N and the M-dimensional vector for frame N+1.

4. The method of claim 1, where the video attribute is an average luminance for that cell.

5. The method of claim 1, where the video attribute is an average luminance for that cell normalized with respect to an average luminance for all cells of that frame.

6. The method of claim 1, where the video signature includes each of the video attributes of frame N concatenated with each of the video attributes of frame N+1.

7. The method of claim 1, where dividing frame N of the video into the plurality of cells includes dividing the frame N into a four by four grid of cells.

8. The method of claim 1, where frame N+1 immediately follows frame N and frame N−1 immediately precedes frame N.

9. The method of claim 1, wherein frame N−1 is divided into M cells and an M-dimensional vector for frame N−1 includes the video attribute for each cell, and wherein calculating the difference metric between frame N and frame N−1 includes calculating a Euclidean distance between the M-dimensional vector for frame N and the M-dimensional vector for frame N−1.

10. The method of claim 1, comprising associating a timestamp with the video signature.

11. The method of claim 1, wherein the first threshold and the second threshold are equal.

12. A method for generating signatures of a video comprising:

dividing a frame N of the video into a grid of M cells comprising an average luminance value for each cell of frame N;

dividing a frame N+1 into the grid of M cells comprising an average luminance value for each cell of frame N+1;

dividing a frame N−1 into the grid of M cells comprising an average luminance for each cell of frame N−1;

calculating an M-dimensional vector for each of frame N, frame N+1, and frame N−1 that includes, for each different dimension, a luminance value of a different cell from that frame;

calculating a Euclidean distance between the M-dimensional vector for frame N and the M-dimensional vector for frame N+1;

calculating a Euclidean distance between the M-dimensional vector for frame N and the M-dimensional vector for frame N−1; and generating a video signature that includes the M-dimensional vector for frame N concatenated with the M-dimensional vector of frame N+1 responsive to the Euclidean distance between frame N and frame N+1 exceeding a first threshold and the Euclidean distance between frame N and frame N−1 not exceeding a second threshold.

13. The method of claim 12, wherein the average luminance value for each cell of a frame is normalized with respect to an average luminance for all cells of that frame.

14. The method of claim 12, wherein the grid of M cells is a four by four grid.

15. The method of claim 12, further comprising iteratively advancing to subsequent frames to search for additional signatures within the video.

16. The method of claim 12, comprising associating a timestamp with the video signature.

17. A data-holding subsystem holding instructions executable by a logic subsystem to:

iteratively test a series of three consecutive frames within a video for a shot change, each test comprising:

dividing a frame N of the video into a grid comprising M cells;

calculating an M-dimensional vector for frame N that includes, for each different dimension of the M-dimensional vector, an average luminance value of a different cell from frame N;

dividing a frame N+1 of the video into a grid comprising M cells;

calculating an M-dimensional vector for frame N+1 that includes, for each different dimension of the M-dimensional vector, an average luminance value of a different cell from frame N+1;

dividing a frame N−1 of the video into a grid comprising M cells;

calculating an M-dimensional vector for frame N−1 that includes, for each different dimension of the M-dimensional vector, an average luminance value of a different cell from frame N−1;

calculating a Euclidean distance between the M-dimensional vector for frame N and the M-dimensional vector for frame N+1;

if the Euclidean distance between frame N and frame N+1 exceeds a first threshold, calculating a Euclidean distance between the M-dimensional vector for frame N and the M-dimensional vector for frame N−1;

generating a video signature that includes the M-dimensional vector for frame N concatenated with the M-dimensional vector of frame N+1 responsive to the Euclidean distance between frame N and frame N−1 not exceeding a second threshold, and iteratively test a next series of three consecutive frames within the video for a next shot change.

18. The data-holding subsystem of claim 17, wherein the average luminance value for each cell of a frame is normalized with respect to an average luminance for all cells of that frame.

19. The data-holding subsystem of claim 17, comprising associating a timestamp with the video signature.

20. The data-holding subsystem of claim 17, wherein the grid is a four by four grid.

* * * * *